(12) United States Patent
Kaltenbach

(10) Patent No.: US 9,167,634 B2
(45) Date of Patent: Oct. 20, 2015

(54) SENSOR SYSTEM FOR BOTTOM ELECTRODES OF AN ELECTRIC ARC FURNACE

(71) Applicant: Michael J. Kaltenbach, New Castle, PA (US)

(72) Inventor: Michael J. Kaltenbach, New Castle, PA (US)

(73) Assignee: SMS DEMAG LLC, Pittsburgh, PA (US)

(*) Notice: Subject to any disclaimer, the term of this patent is extended or adjusted under 35 U.S.C. 154(b) by 0 days.

(21) Appl. No.: 13/998,651

(22) Filed: Nov. 20, 2013

(65) Prior Publication Data
US 2014/0072011 A1 Mar. 13, 2014

Related U.S. Application Data

(62) Division of application No. 12/291,988, filed on Nov. 17, 2008, now Pat. No. 8,693,519.

(51) Int. Cl.
H05B 7/148 (2006.01)
F27D 1/00 (2006.01)
H05B 7/06 (2006.01)
H05B 7/10 (2006.01)

(52) U.S. Cl.
CPC .................................... H05B 7/148 (2013.01)

(58) Field of Classification Search
CPC .............. H05B 7/06; H05B 7/08; H05B 7/12; H05B 7/148; H05B 7/156; F27B 3/085; C21C 5/00; C21C 5/52; C21C 5/5229
USPC ........... 373/60, 104, 105, 71, 72, 108, 74, 94, 373/88, 101, 102, 36, 38
See application file for complete search history.

(56) References Cited

U.S. PATENT DOCUMENTS

| 4,296,269 A | 10/1981 | Stewart et al. |
| 4,730,337 A | 3/1988 | Schubert |
| 4,947,405 A | 8/1990 | Okada |
| 5,383,218 A * | 1/1995 | Bergman et al. ............... 373/107 |
| 5,410,564 A | 4/1995 | Takashiba et al. |
| 6,031,861 A * | 2/2000 | Koster ............................ 373/72 |
| 7,004,626 B1 | 2/2006 | Giberson et al. |

* cited by examiner

Primary Examiner — Hung D Nguyen
(74) Attorney, Agent, or Firm — Paul Bogdon

(57) ABSTRACT

A sensor system for monitoring and controlling the performance of the bottom electrode and the deflection of an electric arc in an electric steel making furnace includes an organized matrix of anode pins interspersed with refractory material and extending toward an electrically conductive plate secured to distal ends of the anode pins. A sensing device includes two temperature sensors at spaced apart locations along each of a distributed select group of anode pins for providing corresponding electrical signals and a current sensor responsive to electrical current flowing through the anode pins of the distributed select group of anode pins for providing a corresponding electrical signal. A controller responsive to the electrical signals derived at the anode pins of the select group operates the power supply and a display for monitoring the electrical performance of the elongated anode pins for heating by the electric arc in the furnace.

9 Claims, 16 Drawing Sheets

SEC B-B

SEC A-A

SENSOR SYSTEM FOR BOTTOM ELECTRODES OF AN ELECTRIC ARC FURNACE

RELATIONSHIP TO OTHER PATENT APPLICATIONS

This patent application is a Divisional application of pending U.S. patent application Ser. No. 12/291,988 in the name of Michael J. Kaltenbach for SENSOR SYSTEM FOR BOTTOM ELECTRODES OF AN ELECTRIC ARC FURNACE.

BACKGROUND OF THE INVENTION

1. Field of the Invention

The present invention relates to a system for enhancing an assessment of the bottom electrode structure of a DC electric arc furnace, and more particularly, to a sensing device and sensor system for obtaining information representing the conditions of the bottom electrode structure of a DC electric arc furnace and which information may be used to operate the furnace.

2. Description of the Prior Art

A bottom electrode structure for a direct current (DC) electric arc furnace (EAF) has several thin electrode pins mounted in a refractory material with the lower ends of the electrode pins secured in a steel base plate and the refractory material supported by the plate. The base plate is provided with a connector for the connection of a power supply. The thin electrode pins are used so that their upper end portions may be less eroded by the molten metal pool formed in the furnace when the furnace is operated. Additionally, several electrode pins are used so that a sufficient electric current may be supplied through the electrode pins and into the molten metal pool or the liquid steel in the furnace. That is, when the furnace is operated, the electric current supplied by the power source, e.g. a DC power source, flows from the connector, through the base plate to the several electrode pins, and into the molten metal pool in the furnace through the electrode pins.

In a typical DC electric arc furnace, the power system supplies the power necessary to melt the charged scrap and raise the liquid steel to a tapping temperature. In general, two electrodes deliver the power to the furnace. An upper electrode which generally is graphite acts as a negative terminal, i.e. a cathode (−) and generates the high temperature electric arc within the furnace. The current passing through the electric arc makes its way through the charged scrap and eventually to the pool of liquid steel above the bottom electrode which acts as a positive terminal (+), i.e. an anode for the furnace's DC power system and which bottom electrode is in direct contact with the liquid steel. The bottom electrode is part of the bottom structure for the EAF and includes the plurality of thin electrode anode pins discussed in the preceding paragraph.

It is common practice to assess the conditions of the bottom electrode by measuring the temperature of several electrode pins to determine the conditions of the refractory material in the bottom structure of the EAF and of the interface between the liquid steel and the bottom electrode. These conditions generally cannot be observed during operation of the EAF and can only be estimated from measured temperature profiles and trends.

This common practice of assessing the conditions of the bottom of an EAF involves a single point temperature measurement of the bottom electrode, that is, only one temperature measurement is made along each of the anode electrode pins from a select group of anode electrode pins. For this temperature measurement, the present practice is to select a distributed sub-set of anode electrode pins and to monitor a temperature point in each of these anode electrode pins of this sub-set. The monitored pins have a longitudinal center bore starting at the distal end at the base plate connection and extending upwardly to a desired depth within the surrounding refractory material. A temperature sensor of matching immersion depth is inserted into the longitudinal center bore of each of the anode electrode pins of the distributed sub-set of anode electrode pins so that the temperature measuring point of each of these anode electrode pins is at the top of the bore between the base plate and the liquid steel. The sensor wiring from this group of monitored electrode pins is routed from the furnace to a PLC remote I/O cabinet where the analog temperatures are detected by a control and monitoring system. Through this arrangement, the temperature magnitude of each anode pin of the sub-set is continuously monitored, trended and displayed in graphical form for visual observation by the operator of the furnace. Presently, this is the only data available for evaluating the conditions of the bottom electrode structure in an EAF. The integrity and longevity of the bottom electrode structure is directly related to the productivity of the EAF.

There is therefore a need to provide additional data for evaluating or assessing the conditions of the bottom electrode structure and to control the electrical power input of the EAF in order to manage the optimization of the bottom electrode.

SUMMARY OF THE INVENTION

The present invention has met this need. The present invention provides a sensor system, a method and a sensing device for monitoring and controlling the performance of a bottom electrode and an electric arc deflection in an electric steel making furnace. The system includes a bottom electrode having a matrix of elongated anode pins that are electrically discrete by interspersed refractory material extending from exposed ends of the elongated anode pins in the direction of elongated length toward an electrically conductive plate secured to distal end portions of the elongated anode pins; a sensing device including at least two temperature sensors at spaced apart locations along each one of a distributed select group of elongated anode pins for providing electrical signals corresponding to measurements of anode pin temperatures at discrete locations along each one of the distributed select group of the elongated anode pins; the sensing device further includes a current sensor responsive to the electrical current flowing through each elongated anode pin of the distributed select group of elongated anode pins for providing a corresponding electrical signal; a controller responsive to the electrical signals derived at each of the elongated anode pins of the distributed select group of elongated anode pins of the matrix of elongated anode pins; a power supply responsive to the controller for providing process power through the bottom electrode and to the electric arc according to measured electrical operating parameters of the furnace; and a display device responsive to the controller for monitoring the electrical performance of the matrix of elongated anode pins for heating by the electric arc in the electric steel making furnace.

Each elongated anode pin of the distributed select group of elongated anode pins is fitted with the sensing device of the present invention. A first temperature sensor is located within the anode pin near the one distal end extending into the refractory material of the bottom electrode structure and a second temperature sensor is located near the bottom of the anode pin within an air cooling duct formed between a base refractory plate assembly and a bottom pin connection plate of the electric steel making furnace. The sensing device further includes a protective sheath containing an insulating material for providing an electrical isolation so as to mitigate potential over voltage damage to sensitive electrical measurement circuits, i.e. either sensitive temperature measurement circuits or sensitive current measurement circuits.

The two temperature sensors are located within the protective sheath of the sensing device and are held in physical contact with the protective sheath and electrical contact with its respective elongated anode pin by a biasing device. The biasing device associated with the first temperature sensor is a spring that acts axially along the protective sheath and the biasing device associated with the second temperature sensor includes a ball and spring plunger assembly. The temperature sensors may be a resistance temperature detector or a thermocouple.

The sensing device of the invention further includes a current sensor formed by a first measuring circuit located within each anode pin near the one distal end extending into the refractory material of the bottom electrode structure and a second measuring circuit located near the bottom of each selected anode pin within the air cooling duct in the bottom electrode structure. The two measuring circuits are also located with the protective sheath containing the insulating material and the two temperature sensors. These circuits are electrically connected to the protective sheath and are held in contact with a protective sheath and therefore the elongated anode pin by the same biasing devices employed for the two temperature sensors. That is, the biasing device associated with the first measuring circuit of the current sensor is the spring that acts axially along the protective sheath and the biasing device associated with the second measuring circuit of the current sensor is the ball and spring plunger assembly discussed herein above relative to the two temperature sensors.

In a preferred embodiment of the invention, the current sensor of the sensing device of the invention further includes circuitry for obtaining the current measurement of each pin of the distributed select group of the elongated anode pins. A sensing method includes a direct voltage measurement method wherein the circuitry includes an analog optical isolation circuitry in the current sensor. Alternatively, the sensing method may include an indirect current measurement method wherein the circuitry includes a Hall Effect device for generating an output signal proportional to the current flowing through the two sets of measuring circuits connected to the current sensor of the sensing device of the invention.

In the preferred embodiment of the invention, the display device may include monitoring means for monitoring and displaying the relative angular position of the arc spot of the electric arc on the surface of the liquid steel in the electric steel making furnace.

It is therefore an object of the present invention to provide a sensor system including a sensing device which enhances the evaluation or assessment of the conditions of the bottom structure of an electric arc furnace.

It is a further object of the present invention to provide a sensor system including a sensing device for obtaining multiple point temperature measurements and a current measurement of a distributed select group of anode electrode pins for enhancing the bottom electrode condition assessment through the correlation of the current distribution and temperature mapping.

It is a still further object of the present invention to provide a sensor system including a sensing device which senses the temperature of at least two locations of an electrode anode pin and which senses the electrical current flow of the same electrode anode pin of a distributed select group of anode electrode pins thereby allowing operating parameters of the furnace such as heat flows, temperatures and currents of the electric arc furnace to be monitored and calculated.

A still further object of the present invention is to provide a sensor system including a sensing device which includes monitoring and displaying the relative angular position of an arc spot of an electric arc on the surface of the liquid steel in the electric steel making furnace for determining the location where the DC current exits the liquid steel surface and travels the arc plasma to the tip of the upper cathode electrode.

A still further object of the present invention is to provide a method for enhancing the evaluation or assessment of the conditions or parameters of the bottom electrode structure of an electric arc furnace.

And yet a further object of the present invention is to provide a sensor system, a sensing device and a method for monitoring and controlling the performance of the bottom electrode and the deflection of the electric arc on the surface of the liquid steel in an electric arc furnace.

These objects and advantages of the present invention will be more fully understood and appreciated when the following description is read in light of the accompanying drawings.

DETAILED DESCRIPTION OF THE INVENTION

Figure 1:
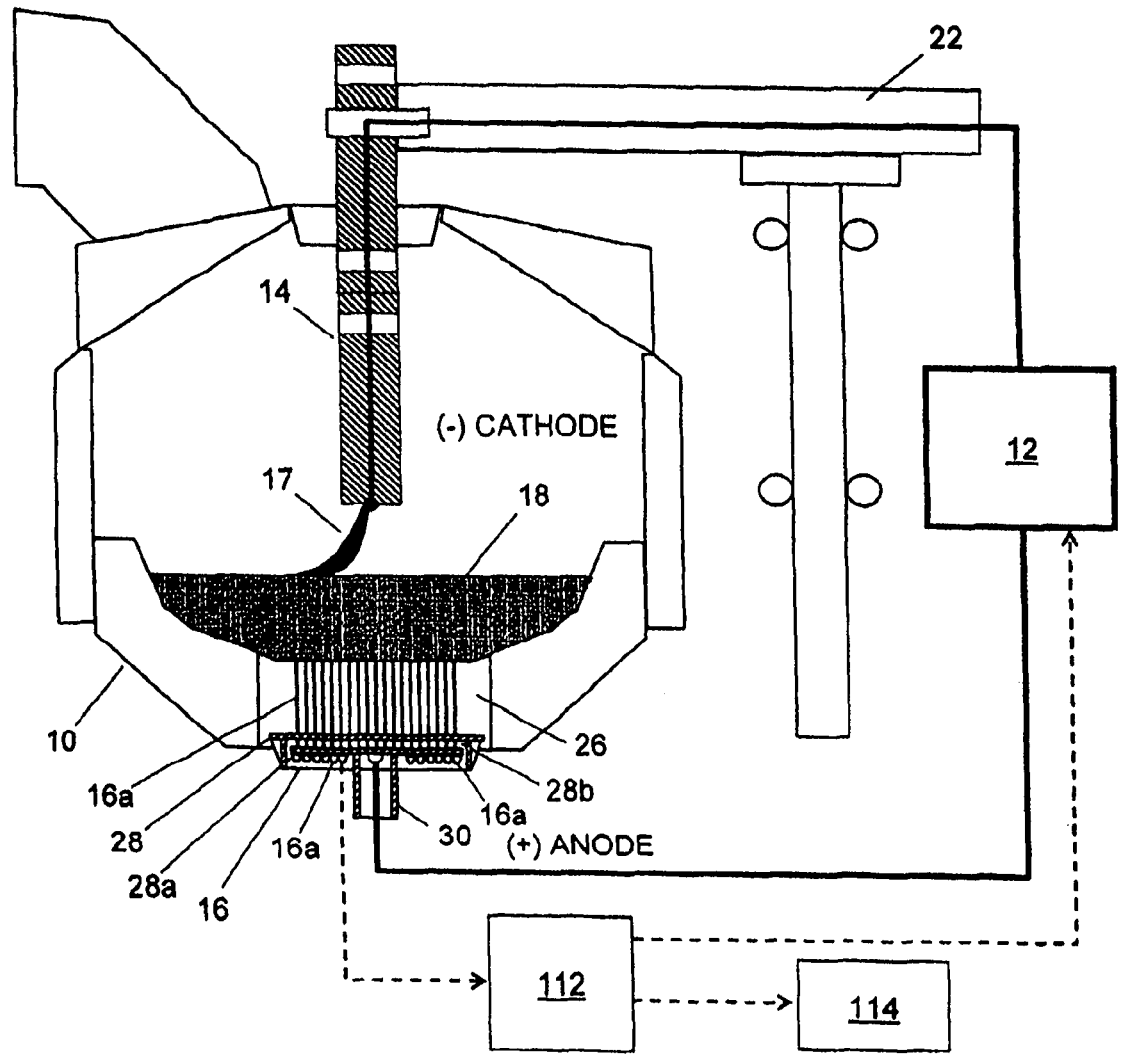
FIG. 1 is a schematic sectional view illustrating a direct current electric arc furnace.

FIG. 1 shows a direct current (DC) electric arc furnace (EAF) 10 which includes a DC power system 12, an upper electrode assembly 14 which provides a negative charge (−) and acts as a cathode and a bottom electrode structure 16 which provides a positive charge (+) and acts as an anode, and which upper electrode assembly 14 and bottom electrode structure 16 form an electric arc 17. The DC power system 12 supplies the process power necessary to melt the steel making materials charged into the furnace 10 and to raise the liquid steel 18 to its tapping temperature. The upper electrode assembly 14 is supported by a support structure 22 and is preferably made of graphite. The bottom electrode structure 16 is in direct contact with the liquid steel 18 and as stated acts as a positive terminal (anode) of the DC power system 12. The bottom electrode structure 16 includes an organized matrix of elongated, thin steel anode pins (one indicated at reference numeral 16a) which are mounted in a refractory material 26 which, in turn, is supported by a steel refractory base plate assembly 28. The refractory material 26 is interspersed throughout the anode pins 16a to separate and isolate each anode pin 16a from the other. Anode pins 16a extend downward through refractory base plate assembly 28 through an air cooled space and into a bottom pin connection plate 28a forming an air cooled duct 28b. Bottom pin connection plate 28a is provided with a connector 30 for connection of the bottom electrode structure 16 to the DC power system 12.

The upper electrode assembly 14 and the bottom electrode structure 16 deliver electrical power to the furnace 10. The upper electrode assembly 14 originates the high temperature electric arc 17 within the furnace 10. Current passes through the electric arc 17 and makes its way through the charged materials and eventually to the pool of liquid steel 18 above the bottom electrode structure 16.

Figure 2A:
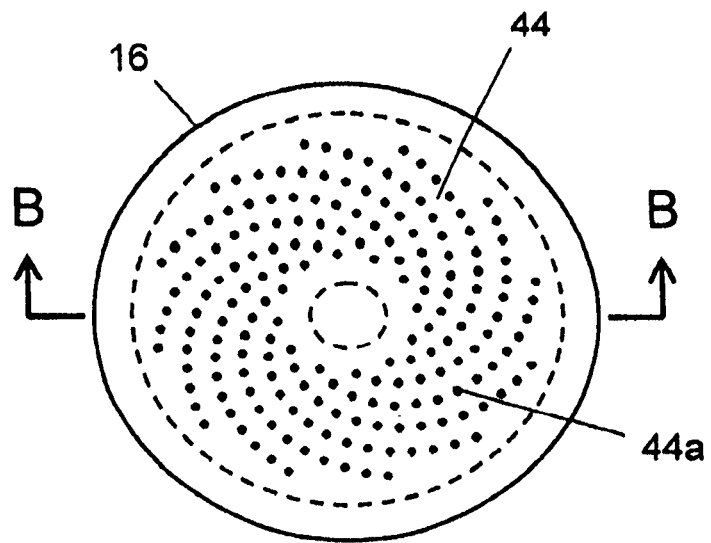
FIG. 2A is a plan view showing the bottom electrode pins in a spiral pin configuration which may be used in the direct current electric furnace of FIG. 1 and is representative of the prior art.
Figure 2C:
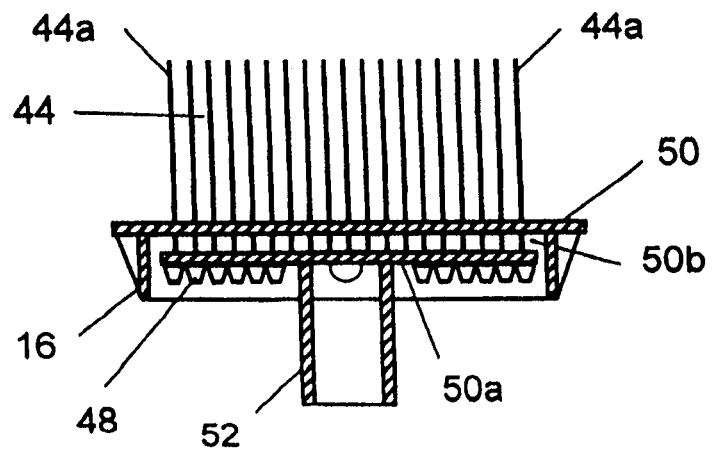
FIG. 2C is a sectional view taken along line B-B of FIG. 2A.
Figure 2B:
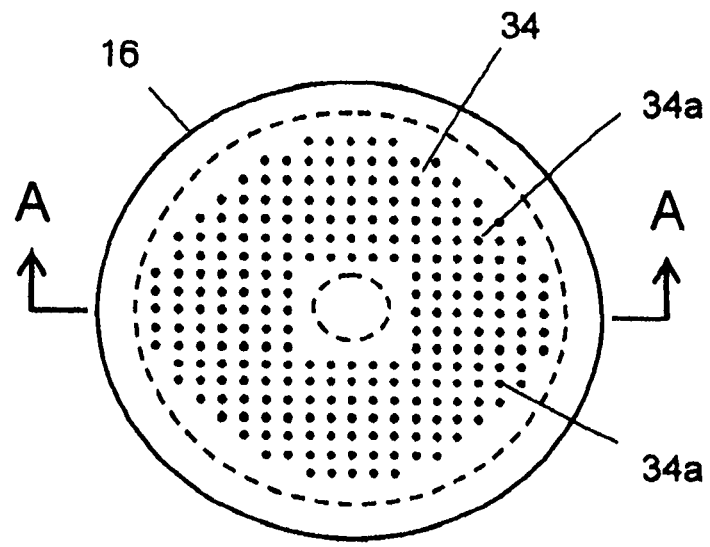
FIG. 2B is a plan view showing the bottom electrode pins in a square pin configuration which may be used in the direct current electric furnace of FIG. 1 and which is representative of the prior art.
Figure 2D:
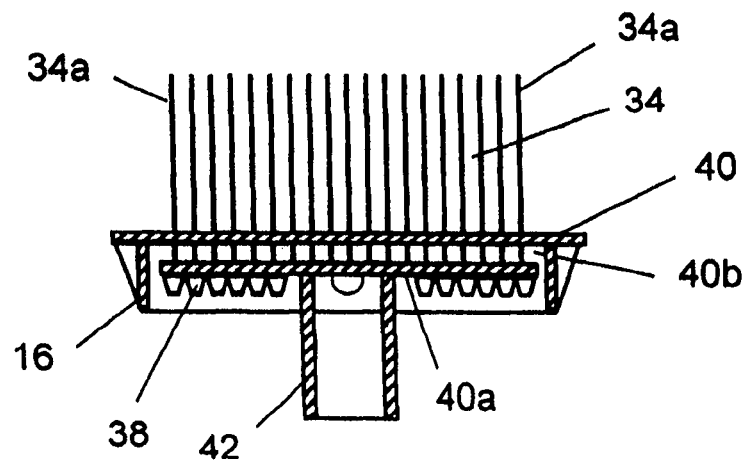
FIG. 2D is a plan view taken along line A-A of FIG. 2B.

FIGS. 2A, 2B, 2C and 2D illustrate two different types of pin configurations, which may be used for the bottom electrode structure 16 of the EAF 10 of FIG. 1. FIGS. 2B and 2D show a square grid configuration 34 for anode pins 34a separated by refractory material (not shown). Pins 34a extend downward through refractory base plate 40 through air duct 40b and are bolted at their one distal end 38 to a bottom pin connection plate 40a where the DC power system connection is made via connector 42 similar to connector 30 shown in FIG. 1. FIGS. 2A and 2C show a spiral grid configuration 44 for pins 44a separated by a refractory material (not shown). Pins 44a extend downward through refractory base plate 50 through air duct 50b and are bolted at their one distal end 48 to a bottom pin connection 50a where the DC power system connection is made via connector 52 similar to connector 30 shown in FIG. 1. As known to those skilled in the art, the distal end 38 of anode pins 34a and the distal end 48 of anode pins 44a are air cooled and insulated by the refractory material, as they extend upwardly through the bottom of the EAF to make contact with the pool of liquid steel 18 (FIG. 1).

As taught in the background section of this patent application, it is common practice to employ a single point temperature measurement of the anode pins of the bottom electrode structure to assess the conditions of the bottom of the electric arc furnace. This is achieved by obtaining only one temperature measurement along a distributed select group of anode pins in order to determine the condition of the refractory material in the bottom of the furnace and the interface of the liquid steel with the bottom electrode structure.

As also taught in the background section of this patent application and with particular reference to FIG. 1, when the electric arc furnace 10 is operated, the electric current supplied by DC power source 12 flows to all of the anode pins 16a via connector 30, through the bottom pin connection plate 28a and into the molten steel 18. These several anode pins 16a, which may range between 100 to 300 anode pins, are used so that a sufficient electric current may be supplied to the liquid steel 18. In general, anode pins 16a of FIG. 1, as well as pins 34a and 44a of FIGS. 2A through 2D perform two major functions. First, they provide a low resistance current connection to the molten metal pool or liquid steel in the EAF. Second, the pin geometry and spacing between the pins control the heat flux so as to maintain a proper temperature gradient, which keeps the bottom of the electric arc furnace physically intact thus preventing a melt through.

Figure 3A:
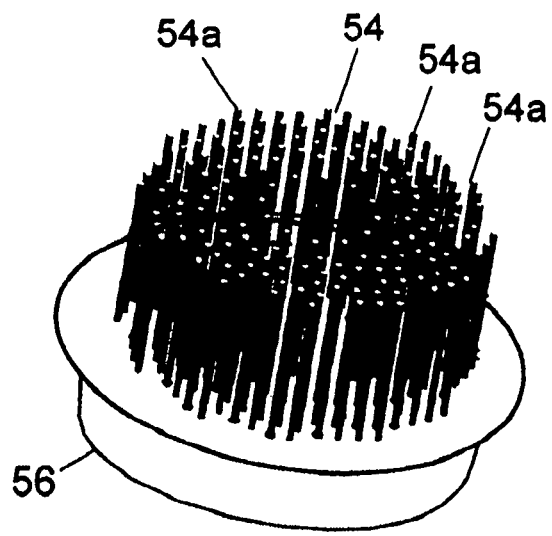
FIG. 3A is a top perspective view of the bottom electrode pins without refractory material and representative of the prior art.
Figure 3B:
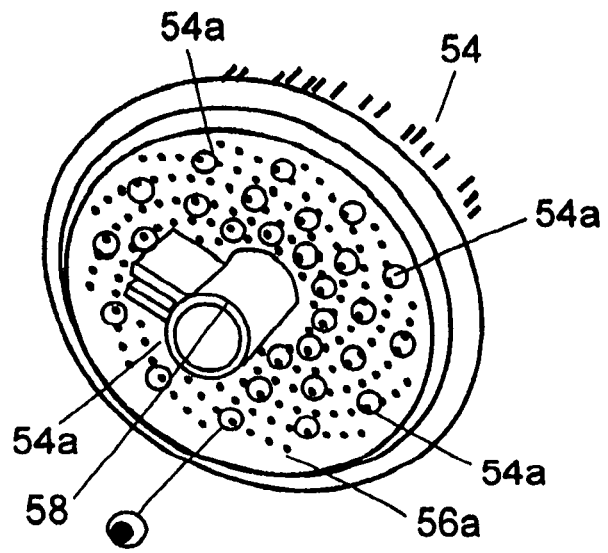
FIG. 3B is a bottom perspective of the bottom electrode pins of FIG. 3A indicating the selected pins for monitoring the temperature according to the teachings of the prior art.

FIGS. 3A and 3B pertain to the present practice of obtaining only one temperature measurement along the anode pins. FIG. 3A shows a top perspective view of an anode assembly 54 having several anode pins, some indicated at reference numeral 54a, extending through refractory base plate 56. FIG. 3B shows a bottom perspective view of the anode assembly 54 of FIG. 3A and the manner in which the anode pins 54a are mounted in bottom pin connection plate 56a wherein the ends of anode pins 54a protrude through bottom pin connection plate 56a. Bottom pin connection plate 56a has a connector 58 for connection to a DC power supply.

According to the present practice, from among the several anode pins 54a shown particularly in FIG. 3A, only a distributed select group of anode pins are used for monitoring one temperature point along the length of each pin of the distributed select group of anode pins. Each of the anode pins of the distributed select group of monitored pins is indicated in FIG. 3B by a black dot at their distal end and some of these monitored pins are indicated by reference numeral 54a The total number of monitored anode pins of the distributed select group indicated by a black dot is generally forty from a total number ranging between 100 to 300 anode pins. The monitored anode pins 54a of the distributed select group of pins of FIGS. 3A and 3B have a longitudinal center bore starting at the distal end at the base plate connection 56a extending upward to a desired depth within the surrounding refractory material. A temperature sensor of matching immersion depth (not shown) is inserted into the bore so that the temperature measuring point is at the top of the bore between the base plate and the liquid steel.

Figure 4:
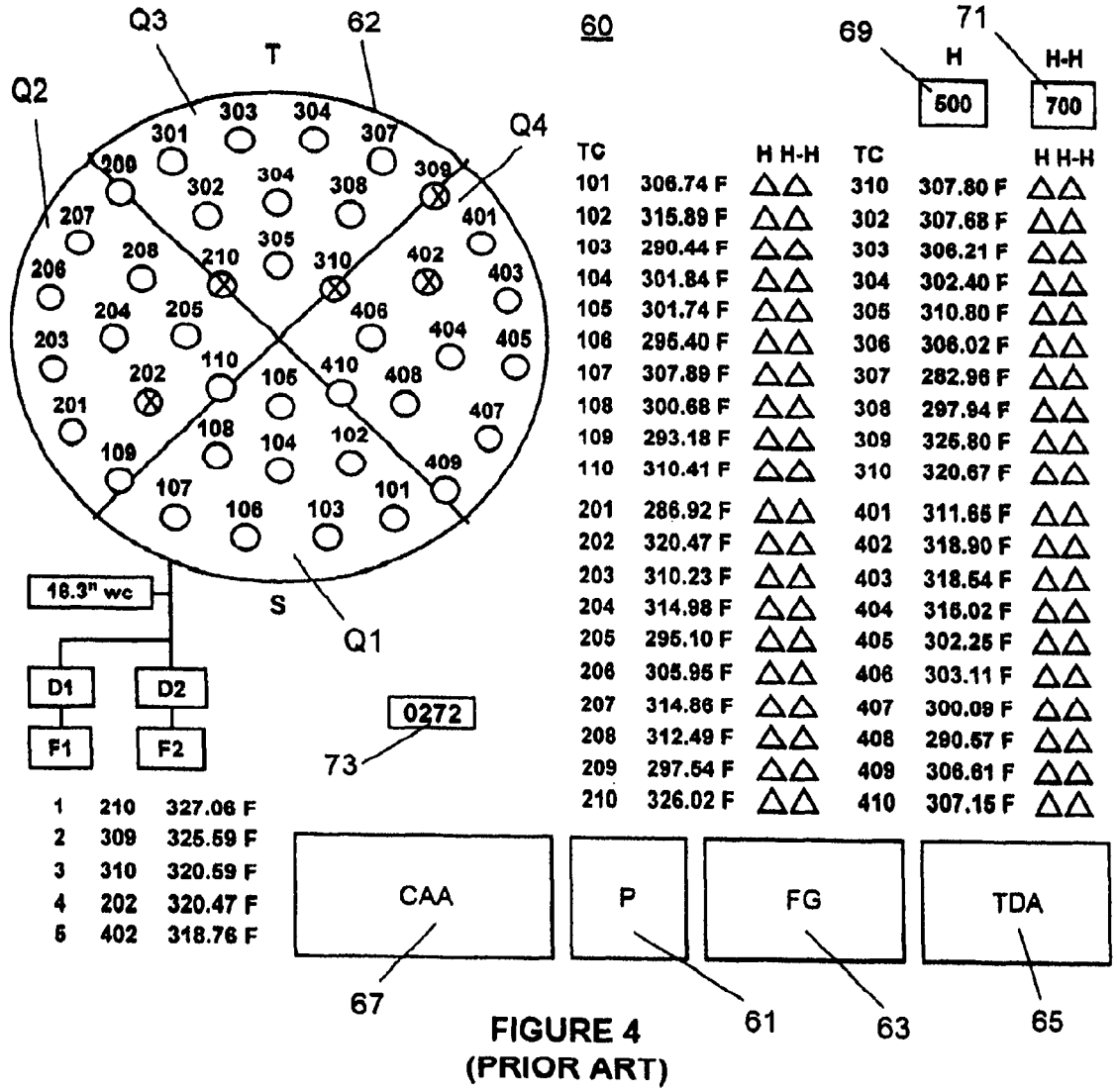
FIG. 4 is an example of a monitor screen providing one temperature measurement obtained for the selected pins of FIGS. 3A and 3B according to the teachings of the prior art.

In this current day practice, the temperature sensing wiring of the monitored anode pins 54a of the distributed select group indicated by the black dot in FIG. 3B are grouped together and routed from the electric arc furnace to a programmable logic controller (PLC) remote input/out (I/O) cabinet (not shown) where the analog temperature of these forty monitored anode pins 54a are read by a controller and monitoring system similar to that shown in FIG. 4.

FIG. 4 shows a human machine interface (HMI) monitoring screen 60 which the operator of the furnace visually observes when one temperature measurement is taken for each of the forty monitored anode pins of the distributed select group of anode pins according to present practice. As can be appreciated, the temperature magnitude of each of these forty anode pins of FIGS. 3A and 3B is continuously monitored, trended and displayed on screen 60 in graphical form. The five hottest anode pins of the forty anode pins of the distributed select group are shown by an "x" on the graphic display 62 and the temperature values for these five hottest anode pins are given at the bottom on the left hand side of FIG. 4. For example, the hottest pin is pin number 210 with a temperature of 327.06° F. (163.92° C.); the second hottest pin is pin number 309 with a temperature of 325.59° F. (163.11° C.); the third hottest pin is pin number 310 with a temperature of 320.59° F. (160.33° C.); the fourth hottest pin is pin number 202 with a temperature of 320.47° F. (160.26° C.); and the fifth hottest pin is pin number 402 with a temperature of 316.76° F. (158.20° C.).

Still referring to FIG. 4, the temperature for all forty bottom electrode anode pins of the distributed select group is shown in the two columns on the right hand side of the screen 60, along with operator controls P (standing for "Permissives") indicated at reference numeral 61, FG (standing for "Fans Group") indicated by reference numeral 63), and TDA (standing for Temperature Disable Alarm) indicated by reference numeral 65. The bottom electrode assembly is represented by the graphic display 62 which is a circle divided into quadrants with physical orientation noted for the tap T and slag S sides of the furnace. Pin numbers 101 through 110 are in a first quadrant Q1; pin numbers 201 through 210 are in a second quadrant Q2; pin numbers 301 through 310 are in a third quadrant Q3; and pin numbers 401 through 410 are in a fourth quadrant Q4 of the graphic display 62. The temperature values for these anode pins in these four quadrants Q1 through Q4 appear in the two columns on the right hand side of screen 60. Operating parameters such as cooling air alarms (CAA) and the monitoring of fans (F1 and F2) and dampers (D1 and D2) generally appear below the graphic display 62 in the box CAA indicated by reference numeral 67. The range for the temperature alarm limits was from 500° F. (260° C.) and to 700° F. (371.00° C.) as indicated at reference numerals 69 and 71. The number of heats when the temperatures for the forty anode pins were taken was 272 as indicated at reference numeral 73. As discussed herein above, this is the only data presently available for evaluating the conditions of the bottom of an electric arc furnace.

Figure 5B:
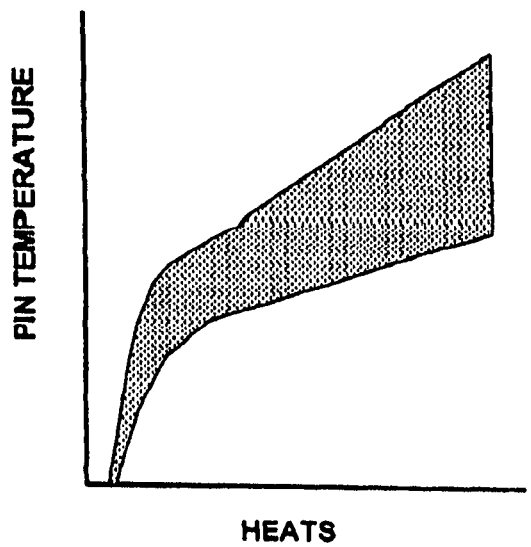
FIG. 5B is a graph of a temperature trend for the anode pin of FIG. 5A.
Figure 5A:
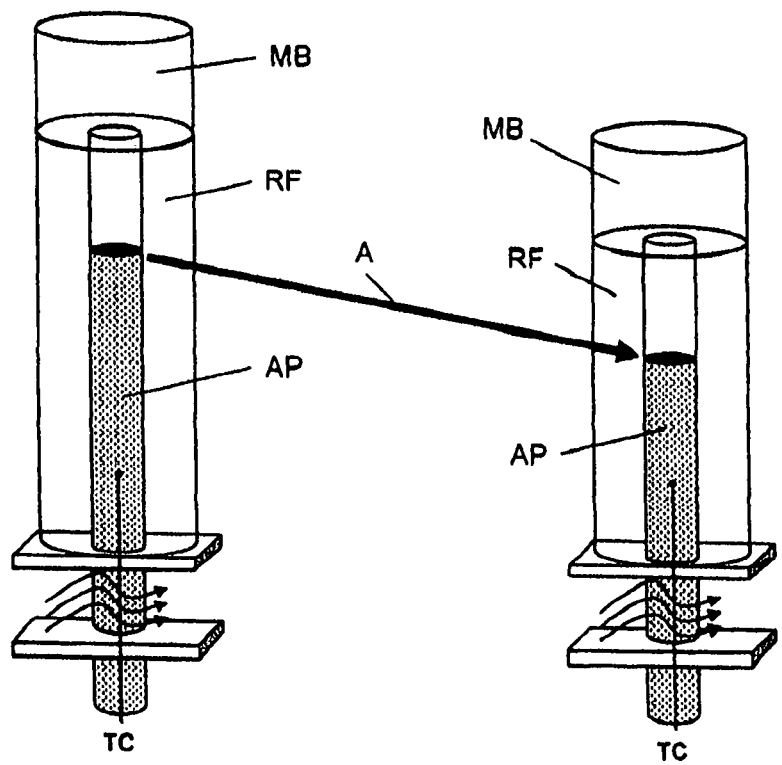
FIG. 5A is a schematic view of a new anode electrode pin at the beginning of a heat and of the same anode electrode pin which is worn after a number of heats and representative of the prior art.

FIGS. 5A and 5B illustrate an example of a temperature trend for an anode pin in a bottom electrode structure of a DC EAF wherein one temperature point for an anode pin AP of a distributed select group of anode pins is obtained via a thermocouple (TC). The left hand side of FIG. 5A shows a new steel anode pin AP surrounded by refractory RF in contact with a metal bath MB at the beginning of a heat and the right hand side of FIG. 5A shows the same anode pin AP and refractory RF in a worn condition after a number of heats in the electric arc furnace. The arrow A pointing from left to right in FIG. 5A indicates the change in the length of anode pin AP and refractory RF due to wear. As shown, the length of anode pin AP and the thickness of refractory RF are decreased causing the position of the metal bath MB to lower within the furnace during the several heats of the furnace. As known to those skilled in the art, the steel anode pins in the bottom electrode structure of the furnace melt and become part of the metal bath MB.

FIG. 5B is a graph showing the temperature trend for the anode pin AP of FIG. 5A. The vertical axis indicates the temperature of the anode pin AP and the horizontal axis indicates the number of heats produced. As the anode pins of the bottom electrode structure wear, the average temperatures generally will increase as shown in FIG. 5B. From this graph, a divergence trend is also noticeable. That is, a deviation from the average temperature rise may either indicate uneven wear of the anode pins of the bottom electrode structure or an uneven current distribution where higher than normal concentrations of current are passing through some of the anode pins. As commonly known, this data depicted in the graph of FIG. 5B becomes a valuable tool to the operator for maximizing the life of the bottom electrode structure of the DC electric arc furnace.

The present invention seeks to improve the present day practice of obtaining a temperature trend for the bottom anode pins of an electric arc furnace as depicted in at least FIGS. 5A and 5B. As stated herein above, instead of obtaining only a single temperature measurement of each anode electrode pin of a distributed select group of anode electrode pins, the invention obtains at least two temperature measurements along two spaced apart locations of each anode pin of the distributed select group of anode pins of the organized matrix of elongated anode pins of the bottom electrode structure.

Figure 6A:
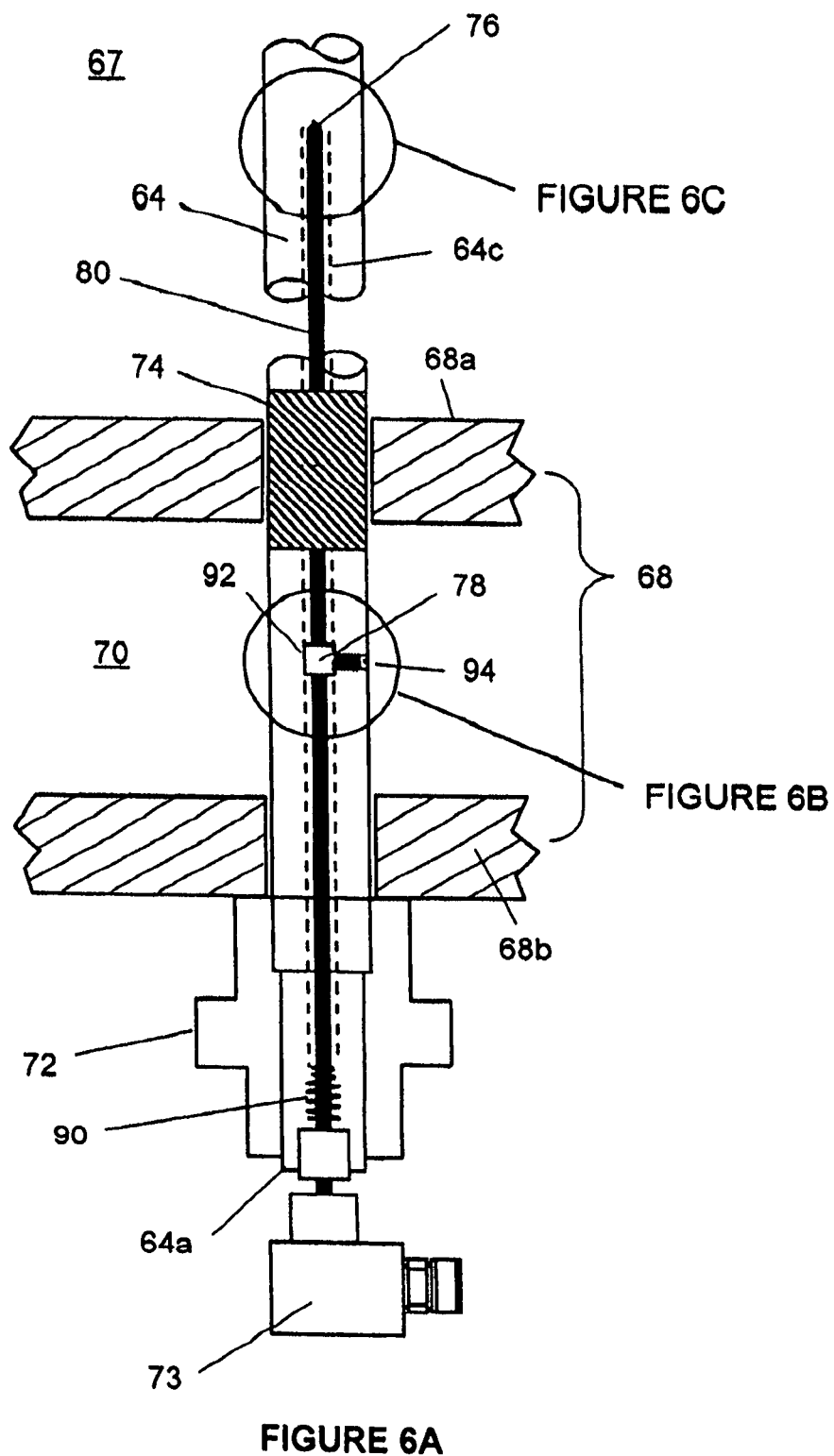
FIG. 6A is a schematic sectional view of a monitored anode pin with the sensing device of the present invention in place and indicating two locations for measuring the temperature of the anode pin according to the teachings of the present invention.

FIGS. 6A through 7D pertain to a sensing device of the invention. FIGS. 6A and 7A illustrate the same sensing device of the present invention which includes two temperature sensors and a current sensor. For the sake of clarity, FIGS. 6A, 6B and 6C show only the two temperature sensors of the invention; whereas FIGS. 7A, 7B, 7C and 7D show the two temperature sensors and the current sensor of the sensing device of the present invention.

Figure 7A:
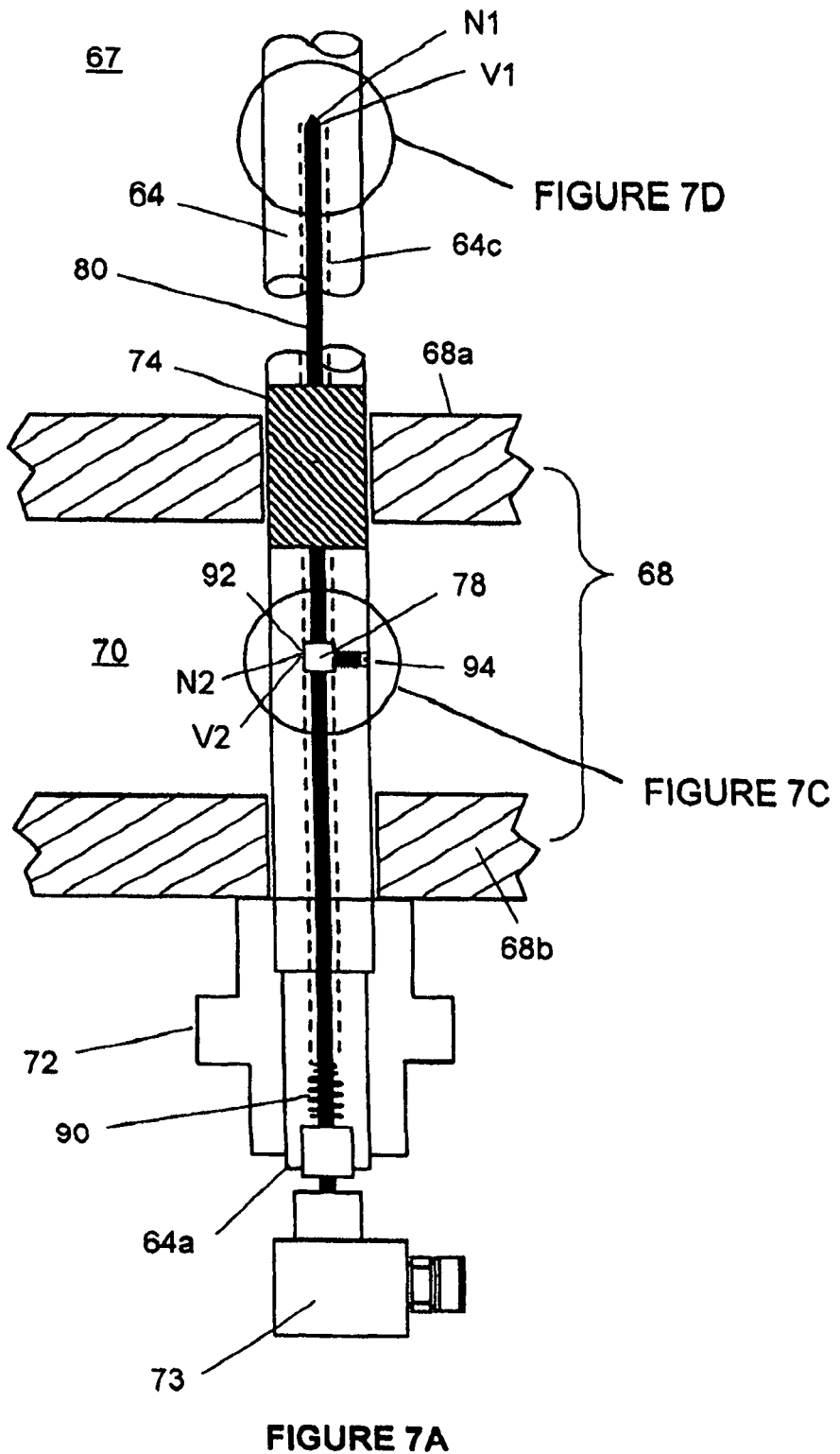
FIG. 7A is a schematic sectional view of a monitored anode pin with the sensing device of the present invention in place and indicating two locations for measuring the temperature and the voltage or current of the anode pin according to the teachings of the present invention.

In FIGS. 6A and 7A, anode electrode pin 64, which is one of the electrode pins among the distributed select group of anode pins, is located in a refractory material 67. This anode pin 64 and the remaining anode pins of the organized matrix of elongated anode pins constituting a bottom electrode structure of an electric arc furnace have portions which are interspersed in the refractory material 67 in such a manner that they are electrically discrete relative to each other. Anode pin 64 extends through a plate assembly 68 which includes a base refractory plate 68a and a bottom pin connection plate 68b, and which plates 68a and 68b are electrically conductive and form an air cooling duct 70 which receives cool air for cooling of anode pin 64 according to standard practice. The distal end 64a of anode pin 64 is secured in bottom pin connection plate 68b via a mounting assembly 72. As is well known in the art, the refractory material 67 extends from the exposed surface of the elongated anode pin 64 in the direction of its elongated length from the electrically conductive base refractory base plate 68a upwards to the metal bath of the electric arc furnace.

Figure 6C:
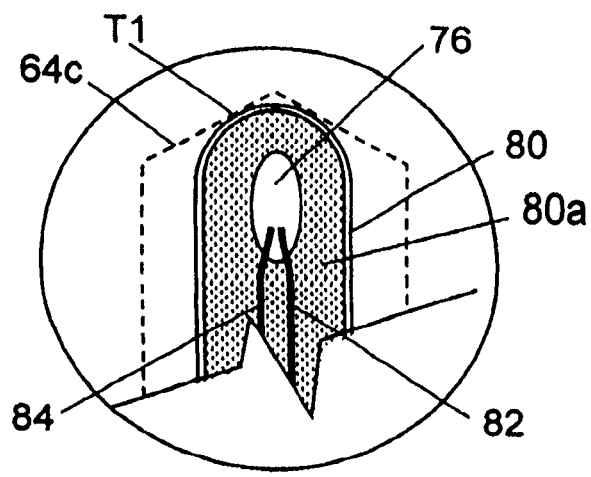
FIG. 6C is an enlarged view of the anode pin of FIG. 6A showing a thermocouple for obtaining the temperature $T_1$ of the anode pin according to the teachings of the present invention.
Figure 6B:
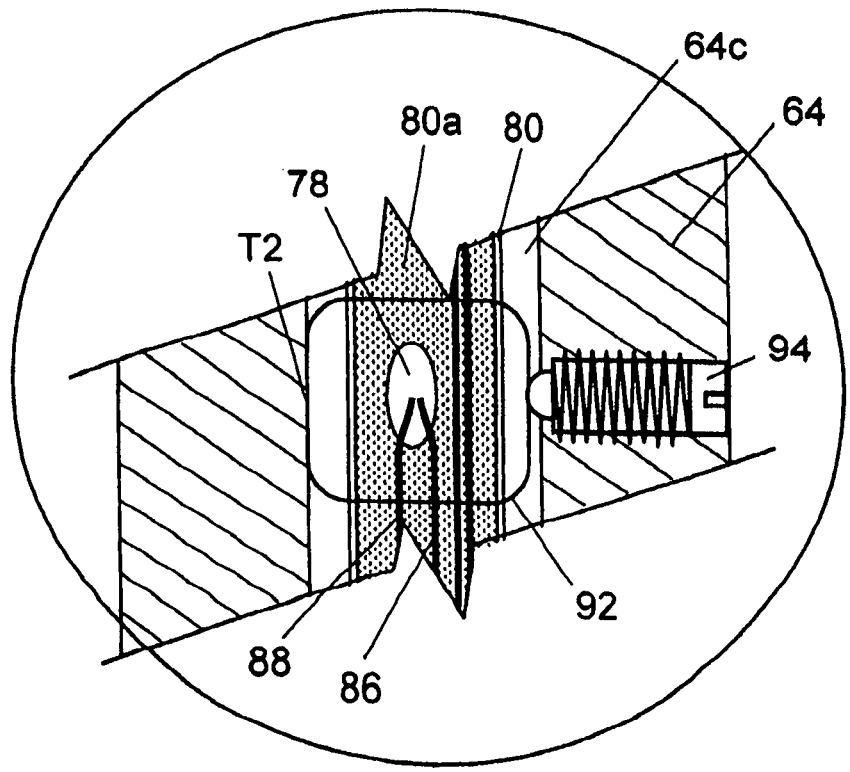
FIG. 6B is an enlarged view of the anode pin of FIG. 6A showing a thermocouple for obtaining temperature $T_2$ of the anode pin according to the teachings of the present invention.
Figure 7D:
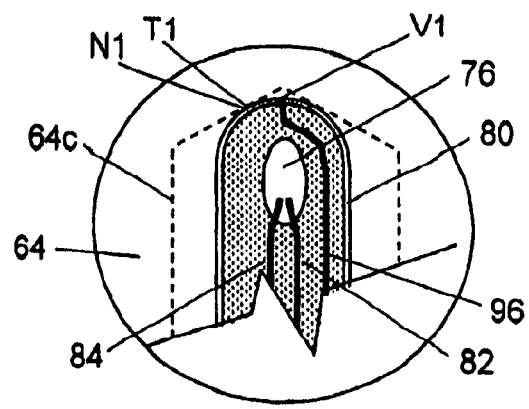
FIG. 7D is an enlarged view of the anode pin of FIG. 7A illustrating the location for measuring the signal $V_1$ according to the teachings of the present invention.
Figure 7B:
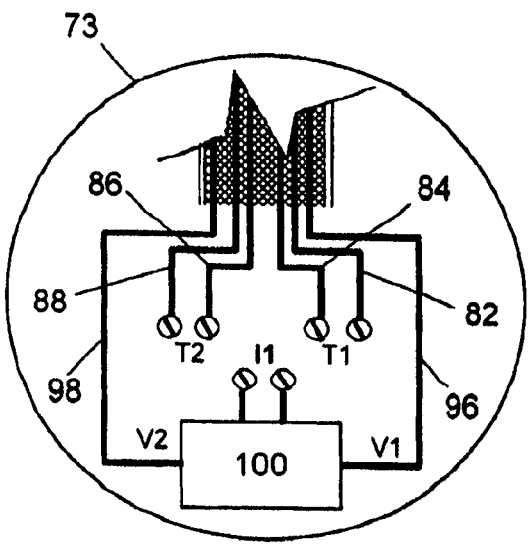
FIG. 7B is an enlarged view of the anode pin of FIG. 7A illustrating a circuit for the current sensor and its measuring circuits within the sensing device of the present invention fitted to the anode pin according to the teachings of the present invention.
Figure 7C:
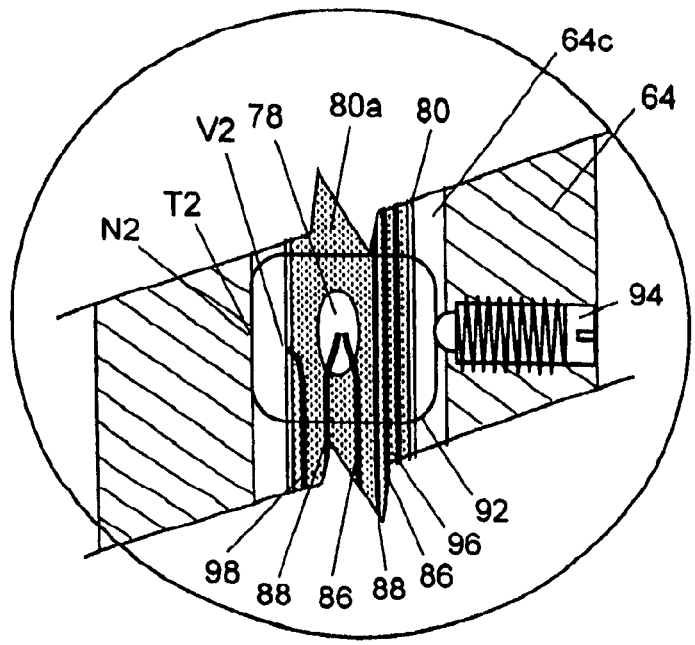
FIG. 7C is an enlarged view of the anode pin of FIG. 7A illustrating the location for measuring the signal $V_2$ according to the teachings of the present invention.

As also shown in FIGS. 6A and 7A, a portion of the anode pin 64 extends between the base refractory plate 68a and the bottom pin connection plate 68b and through the air cooling duct 70. The portion of the anode pin 64 within the refractory base plate 68a is electrically insulated from base refractory plate 68a by insulator assembly 74. Anode pin 64 has a longitudinal center bore 64c starting at its distal end 64a and extending upwardly within the anode pin 64 to a desired depth within the surrounding refractory material 67. Anode pin 64 is fitted with a sensing device housing 73 and includes insulating material 80a within a protective sheath 80 (FIGS. 6B, 6C, 7C and 7D). Protective sheath 80 and insulating material 80a extend the entire length of channel 64c of anode pin 64 and house the two temperature sensors indicated at 76 and 78, which, in turn measure temperatures $T_1$ and $T_2$ (FIGS. 6B, 6C, 7C and 7D). As shown in FIGS. 6C and 7D, the temperature sensor 76 is located within the protective sheath 80 and at the extreme end of protective sheath 80 and channel 64c toward the top portion of anode pin 64. As shown in FIGS. 6B and 7C, the temperature sensor 78 is located near the bottom of the anode pin 64 in the portion extending through the air cooling duct 70. The temperature $T_2$ obtained by the temperature sensor 78 provides information and/or data relating to the effectiveness of the cooling air travelling through air cooling duct 70 of FIG. 6A, as well as information for the calculation of the heat flow within the anode pin 64. Temperature sensors 76 and 78 may be a resistance temperature detector (RTD) or a thermocouple (TC). If thermocouples are used, then the type K thermocouple preferably is selected for its high temperature range and its acceptable response time.

Still referring to FIGS. 6A through 7D, temperature sensors 76 and 78 are suspended in insulating material 80a and encased within the protective sheath 80 located within channel 64c of the anode pin 64. Temperature sensor 76 is electrically connected via a first wiring 82 and a second wiring 84 which extend downwardly in protective sheath 80 in channel 64c to electrical connection terminals labeled "T1" (FIG. 7B) located in sensing device housing 73. Temperature sensor 78 is electrically connected via a first wiring 86 and a second wiring 88, which also extend downwardly in protective sheath 80 in channel 64c to electrical connection terminals labeled "T2" (FIG. 7B) located in sensing device housing 73. Preferably, protective sheath 80 is made of stainless steel and the electrically insulating material 80a is magnesium oxide (MgO).

Since temperature sensors 76 and 78 are ungrounded and since high DC voltages exist in the electric arc furnace, it is necessary to provide an adequate means for electrically isolating temperature sensors 76 and 78 in order to mitigate potential over-voltage damage to the sensitive temperature measuring circuits of sensors 76 and 78; thus, the reason for providing the protective sheath 80 and the insulating material 80a within the protective sheath 80. It is to be appreciated that temperature sensors 76 and 78 will be positioned within protective sheath 80 within insulating material 80a at locations shown in FIGS. 6A and 7A.

With reference again to FIGS. 6A and 7A, in order to further minimize the temperature response time of the temperature sensors 76 and 78 within insulating material 80a, the protective sheath 80 is held in direct contact with the anode pin 64 at the desired temperature measuring points along anode pin 64 by a biasing force. That is, temperature sensor 76 is held at the desired temperature measuring point along anode pin 64 via a coil spring 90 which acts axially along the protective sheath 80 forcing physical contact of protective sheath 80 to the top of channel 64c as shown in FIGS. 6C and 7D and electrical contact with the anode pin 64. As best shown in FIGS. 6B and 7C, temperature sensor 78 is located within insulating material 80a at the desired temperature measuring point along anode pin 64 via a friction collar 92 and a ball and spring plunger assembly 94 forcing physical contact of protective sheath 80 to the side of channel 64c at the desired temperature sensing point as shown in FIGS. 6B and 7C and electrical contact with anode pin 64. Friction collar 92 is preferably welded to the protective sheath 80 and the ball and spring plunger assembly 94 is positioned within the wall of anode pin 64 as particularly shown in FIGS. 6B and 7C. This friction collar 92 generally will fit loosely within the elongated channel 64c of anode pin 64 and therefore will be biased within anode pin 64 via the ball and spring plunger assembly 94.

The sensing device of the present invention also includes a current sensor. The current of each anode pin 64 of the distributed select group of anode pins may be obtained from one of two methods. These methods include a direct voltage measurement method and an indirect current measurement method which may be based on the Hall Effect. These two methods will be discussed with reference to the sensing device housing 73 of the sensing device of the invention represented in FIGS. 6A through 7D, but with particular reference to FIGS. 7A through 7D.

Direct Voltage Measurement Method

The direct voltage measurement method for obtaining the current in each anode pin 64 of the distributed select group of anode pins applies Ohm's law which states that the current flow between any two nodes of a conductor is equal to the difference in the voltages of these two nodes divided by the electrical resistance between the two nodes. Anode pin 64 is the conductor with a first node $N_1$ having a voltage $V_1$ and located at the top of the elongated channel 64c as shown best in FIGS. 7A and 7D and a second node $N_2$ having a voltage $V_2$ and located within elongated channel 64c close to temperature sensor 78 of the portion of anode pin 64 extending within air cooling duct 70 as shown in FIGS. 7A and 7C. The current sensor wirings for $V_1$ and $V_2$ are electrically connected to protective sheath 80 of the sensing device at the desired measuring points along anode pin 64. FIG. 7D shows a first current sensor wiring 96 electrically contacting protective sheath 80 of the anode pin 64 at the first node $N_1$ having voltage $V_1$. FIG. 7C shows a second current sensor wiring 98 electrically contacting protective sheath 80 of the anode pin 64 at the second node $N_2$ having voltage $V_2$, which allows the voltage drop between these two nodes $N_1$ and $N_2$ to be measured by a current sensor 100 (FIG. 7B). As best shown in FIGS. 7A and 7B the current sensor 100 is located within sensing device housing 73 first shown in FIG. 6A. In using the direct voltage measurement approach, the difference in the voltages $V_1$ and $V_2$ will be the voltage signal V that is divided by the total resistance R between the two nodes $N_1$ and $N_2$ of anode pin 64 including the resistance of protective sheath 80. The value for this total resistance R is calculated knowing the electrical properties of the materials used for anode pin 64 and the protective sheath 80 and their respective cross sectional areas that provide the path for the current flow between nodes $N_1$ and $N_2$. As known to those skilled in the art, the resistivity of electrically conductive materials is dependent on temperature, therefore to improve the accuracy of the calculated total resistance and thus the accuracy of the current measurement, the average value of temperatures measured at $N_1(T_1)$ and $N_2$ ($T_2$) will be used to correct the resistivity values of anode pin 64 and the protective sheath 80 materials.

The equation for calculating the current I (FIG. 7A) is:

$$I = \frac{(V_2 - V_1)}{R} = \frac{V}{R} \qquad \text{(Equation No. 1)}$$

The resultant current I, represents the actual current flowing through the anode pin 64. In order to increase the accuracy of measurement of this pin current I, the insulating material 74 (FIGS. 6A and 7A), which preferably is a high temperature ceramic or enamel coating, is applied to the external surface of anode pin 64 in the area of base refractory plate 68a to prevent the exchange of current flow between anode pin 64 and base refractory plate 68a.

A further increase of accuracy of the voltage measurement for this method will be obtained via the biasing of protective sheath 80 against anode pin 64 at the voltage measuring points $V_1$ and $V_2$. That is, similar to the arrangement of FIGS. 6A-6C for the temperature sensors 76 and 78, protective sheath 80 is held in direct contact with anode pin 64 at $V_1$ (FIG. 7D) through the coil spring 90 (FIG. 7A) which acts axially along the protective sheath 80. Direct contact for protective sheath 80 with anode pin 64 at $V_2$ is maintained via friction collar 92 and ball spring and plunger assembly 94 as discussed with reference to FIGS. 6A-6C and the two temperature sensors 76 and 78.

It is further envisioned that electrical isolation of the sensitive measuring circuits from the high DC voltages which are present in the electric arc furnace be achieved for this direct voltage measurement method through the use of an analog optical isolation circuitry in the current sensor 100 (FIG. 7B). That is, the electrical signal from the furnace is converted to an optical signal (light) then transmitted across an electrically insulated barrier where the optical signal is received then converted back to an electrical signal isolated from the damaging effects of the furnace power supply. For example, the voltage signal V appearing in the above Equation No. 1 which represents the difference in the voltages $V_1$ and $V_2$ at the two nodes $N_1$ and $N_2$ drives a light emitting diode (LED) source. The LED is optically coupled to the measurement circuitry output, current I, by current sensor 100, thereby providing electrical isolation from the electric arc furnace.

Indirect Current Measurement Method

The indirect current measurement method for measuring the current in anode pin 64 of FIGS. 7A-7D applies the Hall Effect to a sample of current of known proportion through anode pin 64. The Hall Effect is basically the migration of a positive charge and a negative charge to opposite sides of a semi-conductor in the presence of a magnetic field. This separation of charge produces a signal voltage that is proportional to the magnetic field, and thus proportional to the current flow that produced it. FIG. 7D shows first sensor wiring 96 electrically contacting protective sheath 80 of anode pin 64 at voltage $V_1$ of node $N_1$ and FIG. 7C shows the second sensor wiring 98 electrically contacting protective sheath 80 of anode pin 64 at voltage $V_2$ of node $N_2$. As shown in FIG. 7B, current sensor 100 receives voltage $V_1$ and voltage $V_2$. In this indirect current method, current sensor 100 will contain a Hall Effect device (not shown), which connects voltage $V_1$ and voltage $V_2$ allowing a portion of the current of anode pin 64 to flow between the two nodes $N_1$ and $N_2$. The magnetic field generated by the current flow through the first sensor wiring 96 and the second sensor wiring 98 will then be sensed by the Hall Effect device (not shown). The Hall Effect device will then generate an output current signal $I_2$ of current sensor 100, which is proportional to the current flowing through the sensor wirings 96 and 98. Considering uniform current density for DC currents, this current signal $I_2$ will then be proportioned by the ratio of the sum of cross sectional areas of anode pin 64 and protective sheath 80 divided by the cross sectional area of sensor wirings 96 and 98 between $N_1$ and $N_2$ to represent the current flowing through the anode pin 64.

When using this indirect current measurement method for measuring the current in anode pin 64, it is envisioned that isolation of the sensitive measuring circuits from the high DC voltages known to be present in the electric arc furnace will be achieved through the physical separation of the output circuitry of Hall Effect device contained in sensor 100 and the current signal that is generated from the connection of voltage $V_1$ and voltage $V_2$ to the Hall Effect device. Within the Hall Effect device, the electrical current signal from the furnace generates a magnetic field that crosses an electrically insulated barrier where the magnetic field is received then converted back to an electrical signal isolated from the damaging effects of the furnace power supply.

Figure 8:
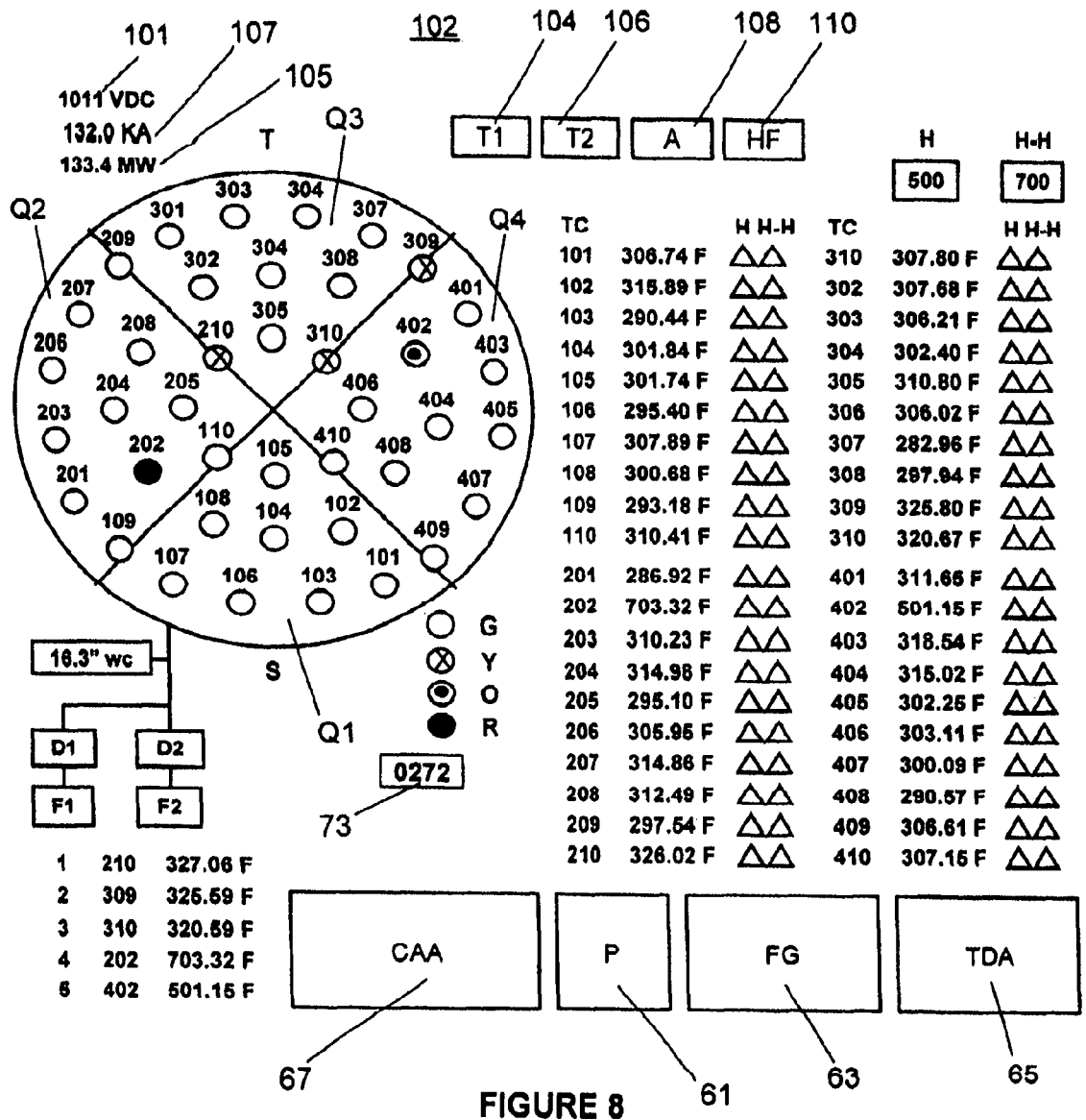
FIG. 8 is an example of a monitoring screen which selectively provides variables, such as the $T_1$ pin temperatures (° F.) as illustrated therein for the selected anode pins of FIGS. 3A and 3B according to the teachings of the present invention.
Figure 9:
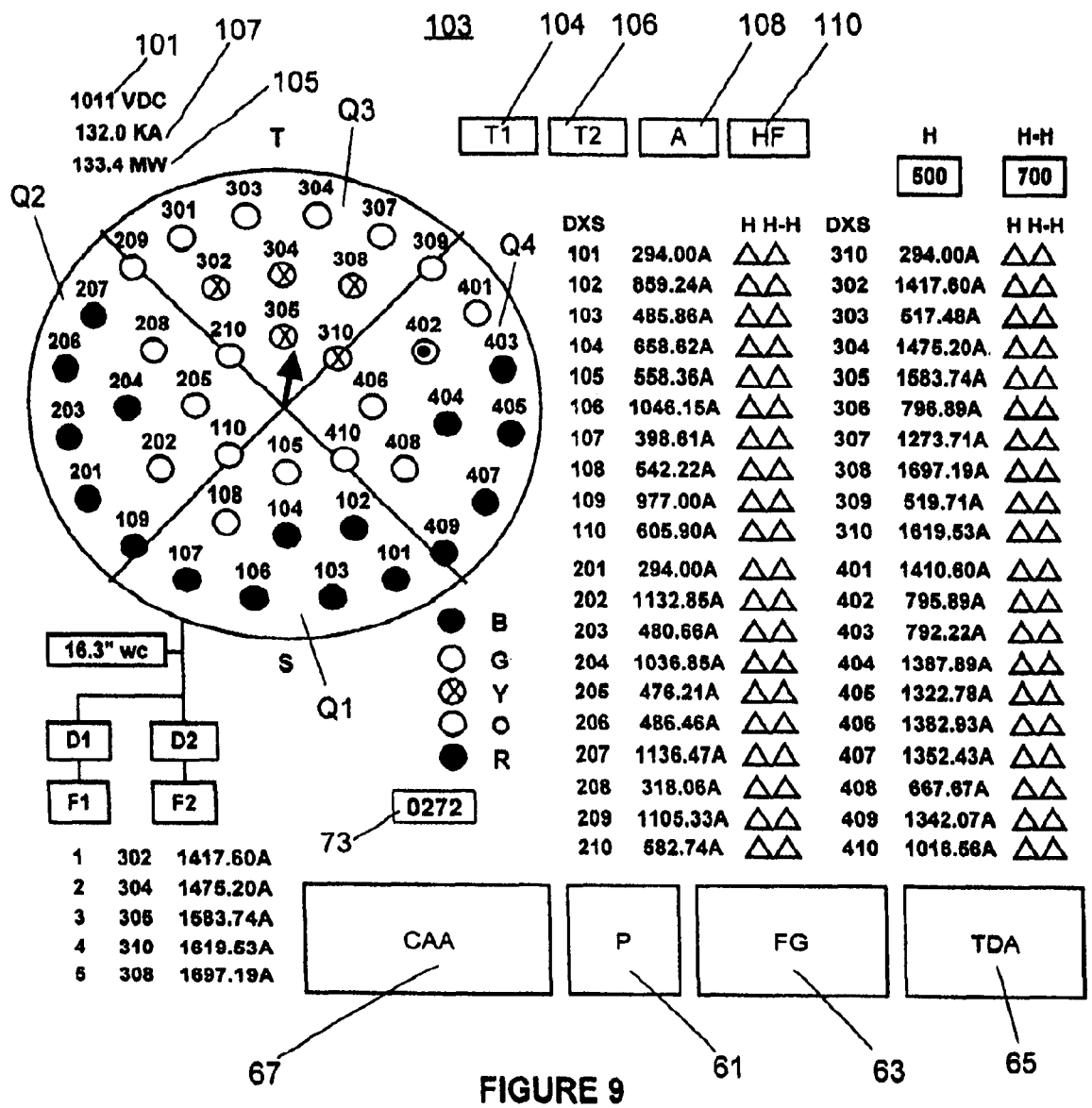
FIG. 9 is a further example of a monitoring screen similar to FIG. 8 which selectively provides variables, such as the pin current A as illustrated therein for the selected anode pins of FIGS. 3A and 3B according to the teachings of the present invention.

FIGS. 8 and 9 illustrate examples of an HMI monitoring screen 102 and 103, respectively for monitoring the performance of the bottom electrode structure of the electric arc furnace in accordance with the teachings of the invention. Monitoring screens 102 and 103 are designed to provide variables for the bottom electrode pins of the distributed select group of anode pins. These variables generally include the two temperature values T1 and T2 for each of the monitored anode pins 64, the pin currents A, and the pin heat flux HF. One of these four variable can be selected by the operator through operation of buttons 104, 106, 108 and 110 appearing in the top area of screens 102 and 103, and the corresponding information will appear in the two columns located on the right hand side of screens 102 and 103.

With reference to FIG. 8, monitoring screen 102 shows the temperature T1 for each of the forty anode pins of the distributed select group of anode pins as discussed herein above with reference to FIGS. 6A through 7D. As can be appreciated, the two temperatures $T_1$ and $T_2$ of each of these forty anode pins 64 of FIGS. 6A through 7D are continuously monitored, trended and can be selectively displayed on screen 102 in graphical form. As shown in FIG. 8, quadrant $Q_1$ contains pins 101 through 110; quadrant $Q_2$ contains pins 201 through 210; quadrant $Q_3$ contains pins 301 through 310; and quadrant $Q_4$ contains pins 401 through 410. As also shown, the values for the first temperature T1 of these pins is indicated in the two columns located on the right hand side of screen 102. As stated herein above, the first temperature T1 for these monitored pins appears in the two columns via operation of button 104. The second temperature T2, the pin currents (A), and the pin heat flux (HF) of these anode pins of the distributed select group can also be selected by pushing the respective buttons 106, 108 and 110 indicated in FIG. 8 and the values will appear in the two columns of screen 102.

FIG. 8 shows the values for the first temperature $T_1$ for the forty anode pins of the distributed select group of pins. The five hottest pins are shown in the bottom portion at the left hand side of FIG. 8. The highest temperature pins are pin numbers 210, 309, 310, 202 and 402. Pin numbers 210, 309 310 are indicated by an "x" on the graphic display screen 102. The temperature values for these anode pins 210, 309 and 310 are 327.06° F. (163.92° C.), 325.59° F. (163.11° C.), and 320.59° F. (160.33° C.), respectively. Pin number 402 has a temperature of 501.15° F. (260.64° C.) which is indicated with a central dot and which is indicated on screen 102 with an "O" which represents a "High Temp Alarm". Pin number 202 has a temperature of 702.32° F. (372.40° C.) which is indicated by a black circle and which is indicated on screen 102 with an R representing a "High High Alarm". As can be appreciated, the pushing in of button 106 will produce a display screen similar to that of FIG. 8 displaying the temperatures $T_2$ values for the anode pins of the distributed select group and the furnace operating parameters; pushing in of button 108 will produce a display screen displaying the current values for the anode pins of the distributed select group and the furnace operating parameters; and pushing in of button 110 will produce a display screen displaying the various flux values for the anode pins of the distributed select group and the furnace operating parameters. Some of the furnace operating parameters are indicated in the upper left hand side of screen 102 of FIG. 8 by reference numerals 101, 103 and 105, and which furnace parameters include voltage (VDC), current (KA), and wattage (MW).

FIG. 9 shows a display screen 103 for displaying the current of the forty anode pins of the distributed select group and the operating parameters of the furnace. This FIG. 9 appears when button 108 of FIGS. 8 and 9 is activated. The five highest pin currents appear in anode pins 302, 304, 305, 310 and 308 which have current values of 1417.60 amperes, 1475.20 amperes, 1583.74 amperes, 1619.53 amperes; and 1697.19 amperes, respectively. These current values and anode electrode pin numbers appear in the display with an "x" in a circle. The lowest currents (B) are represented by blackened circles and the medium currents (G) are represented by clear circles. There are no high current alarms (O) or high-high alarms (R) appearing on the screen 103.

As discussed herein above, the present invention provides additional data for evaluating the conditions of the bottom electrode structure of an electric arc furnace. These additional data include four variables, i.e. a first temperature $T_1$, a second temperature $T_2$, the current a, and the heat flux HF of each anode pin of the distributed select group of anode electrode pins, which can be monitored and displayed. From these variables, the following parameters can be monitored and/or calculated: (1) the effect of the air cooling in the duct on all the anode pins of the bottom electrode structure; (2) the general heat flow distribution among all the anode pins of the bottom electrode structure; (3) the general current distribution among all the anode pins of the bottom electrode structure; (4) the correlation of the heat flows, temperatures and currents of the anode pins of the distributed select group of anode pins of the bottom electrode structure; and (5) the calculation of the deflection angle of the electric arc from interpolation of an arc spot associated with the surface of the liquid steel in the furnace and associated with the bottom electrode structure. Knowing the heat flow and current distribution in the anode pins is anticipated to greatly enhance the predictability of the performance and life of the bottom electrode structure. This information is also anticipated to provide improved feedback for the evaluation of new designs for the bottom electrode structure.

Figure 10A:
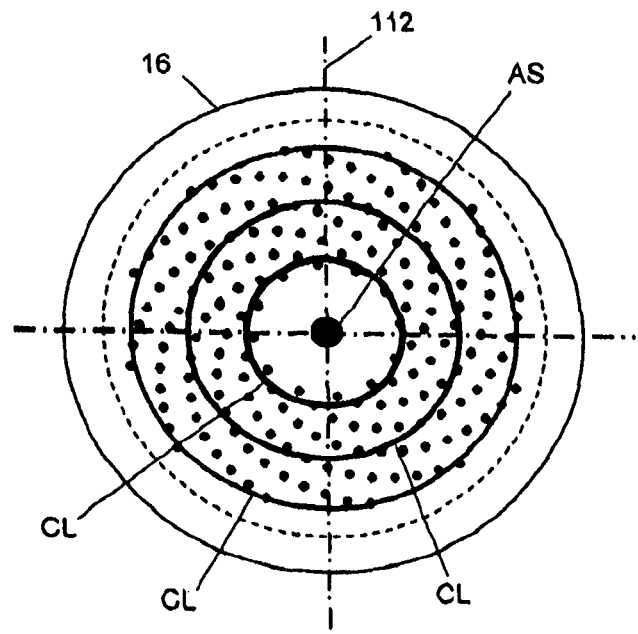
FIG. 10A is a top schematic view showing the positioning of an arc spot on the liquid steel surface associated with the bottom electrode structure of an electric arc furnace and which arc spot is detected according to the teachings of the present invention.
Figure 10B:
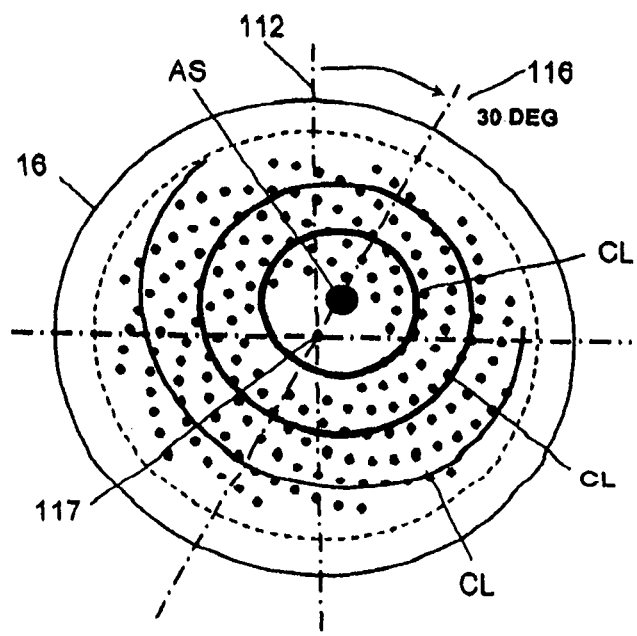
FIG. 10B is a top schematic view showing a deflected arc spot on the liquid steel surface associated with the bottom electrode structure of an electric arc furnace and which deflected arc spot is detected according to the teachings of the present invention.
Figure 11:
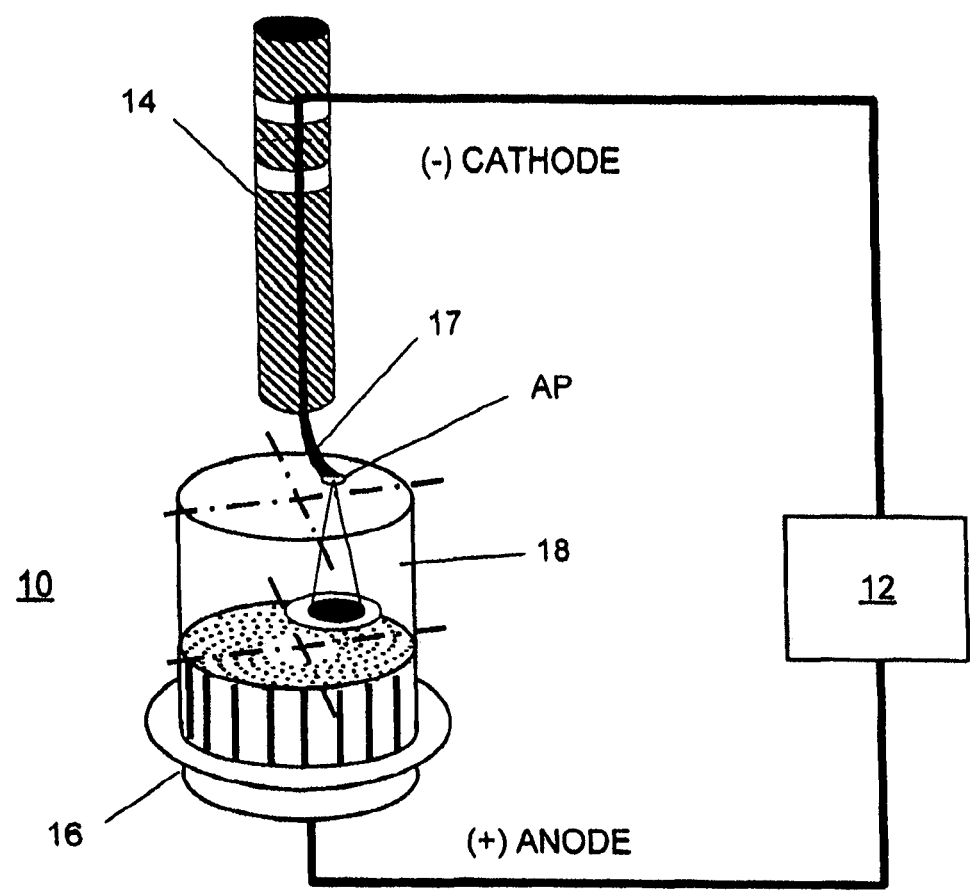
FIG. 11 is a schematic elevational view of an electric arc furnace illustrating the deflected arc spot of the upper cathode relative to the electrode pins of the bottom electrode structure.

In FIG. 9, the arrow in the circle indicates that the flat bath arc deflection angle generally appears in the area of anode pin number 305. The measured current distribution is anticipated to indicate the relative angular position of the arc spot on the surface of the liquid steel (FIG. 1). The arc spot is the location where the DC current exits the liquid steel surface and travels the arc plasma to the tip of the upper electrode assembly 14 of FIG. 1. With reference to FIGS. 1, 10A and 10B, and as shown in FIG. 10A, the arc spot AS should be centered in the furnace 10 in order to achieve uniform power distribution within the furnace 10 (FIG. 1). If the arc spot AS is perfectly centered as indicated at AS in FIG. 10A, the current distribution in the bottom electrode structure 16 would consists of concentric equal current lines CL shown by the blackened concentric circles which are centered on the electrode 16 as shown in FIG. 10A. The arc spot AS is most often not centered in the furnace but is deflected outward due to the large DC currents that supply power to the furnace also producing large magnetic fields that surround the power conductors, upper electrode 14, furnace 10 and electric arc 17 (FIG. 1). The current flow through electric arc 17 is subjected to deflecting forces according to Lenz's law when an external magnetic field is present. The deflected arc 17 causes a non-uniform power distribution within furnace 10. Deflection of arc spot AS from the center of FIG. 10A is shown in FIG. 10B. This deflection of arc spot AS is located along a 30 degree angled line 116 as shown by the dotted line from the vertical axis indicated at reference numeral 112 and through the X-Y coordinate system origin 117 at the center of bottom electrode assembly 16. This location for the deflected arc spot AS of FIG. 10B can be obtained via mathematical extraction of the equal current lines CL of FIG. 10A from the measured distribution. The values of measured currents associated with the monitored anode pins of the distributed select group of pins, and the relative positions (X-Y coordinates) of all pins are used to interpolate the estimated currents in the remaining non-monitored pins. From this data, a "best fit" of closed circular equations connecting equal current points are developed and the coordinates of the geometric center of each equation is defined. The calculated geometric centers (centroids) along with the origin 117 (X, Y=0.0) are trended with a linear approximation line 116 through the origin 117 defining the deflection angle. As shown in FIG. 10B, the concentric equal current lines CL shown by the blackened concentric circles of FIG. 10A are moved along with the location of the arc spot AS. FIG. 11 clearly shows the deflected arc spot AP of the electric arc 17 on the top surface of the liquid steel 18 relative to the top electrode assembly 14 and the bottom electrode assembly 16 in the electric arc furnace 10.

Figure 12A:
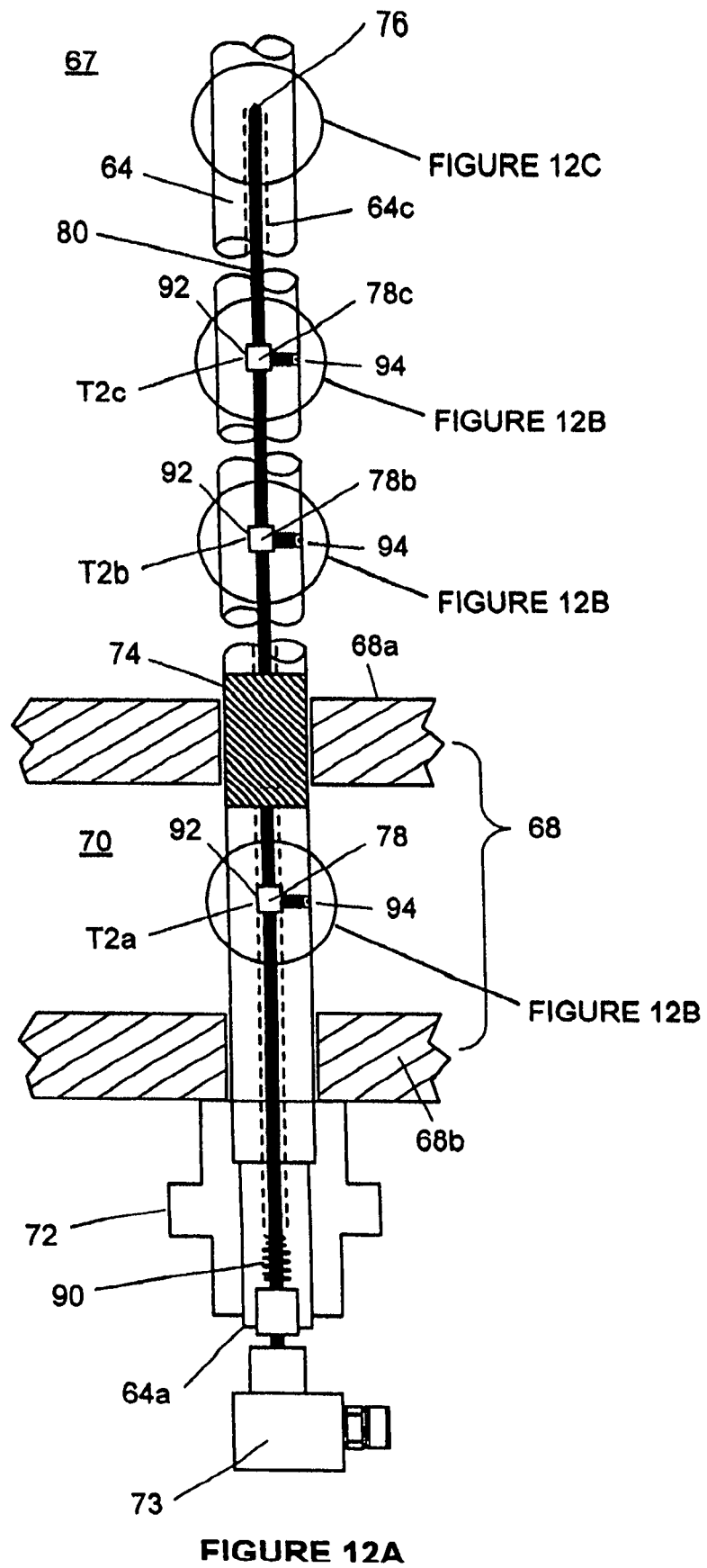
FIG. 12A is a schematic sectional view of an anode pin indicating more than two locations for measuring the temperature of the anode pin according to a further embodiment of the present invention.
Figure 12C:
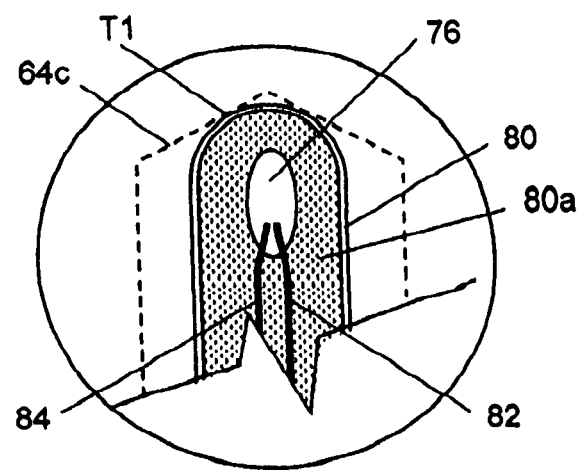
FIG. 12C is an enlarged view of the anode pin of FIG. 12A showing a thermocouple for obtaining the temperature $T_1$ of the anode pin according to the teachings of the present invention.
Figure 12B:
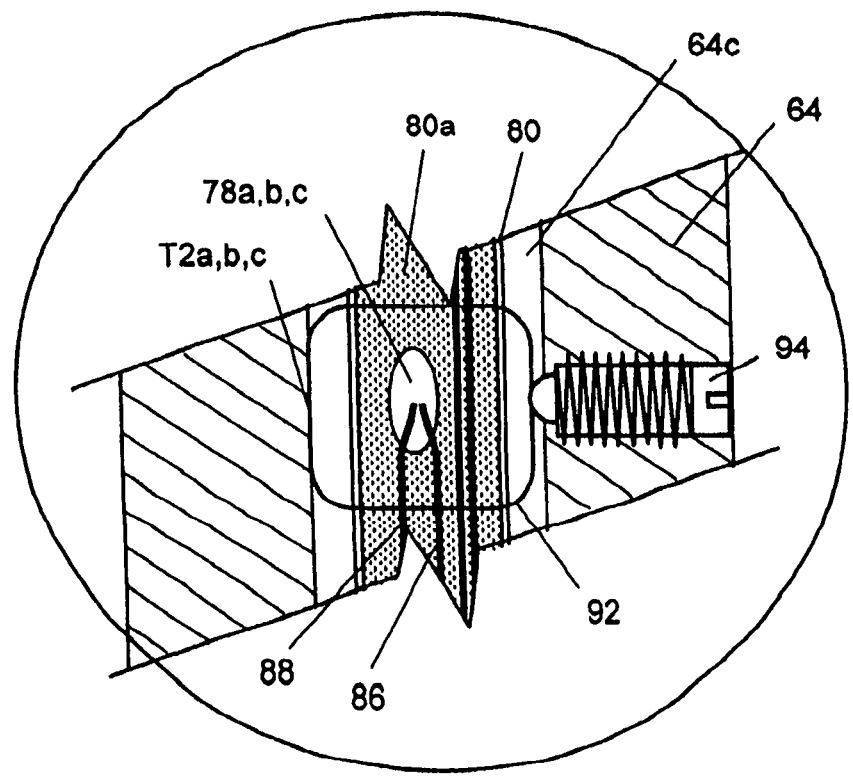
FIG. 12B is an enlarged view of the anode pin of FIG. 12A representing a thermocouple along three locations of the anode pin for obtaining temperatures $T_{2a}$, $T_{2b}$, and $T_{2c}$ of the anode pin according to the teachings of the present invention.

FIGS. 12A, 12B and 12C show a further embodiment of the present invention wherein additional temperature sensors 78b and 78c may be positioned between two locations $T_1$ for temperature sensor 76 and $T_{2a}$ for temperature sensor 78a shown in FIG. 12A along the anode pin 64. These several temperature values $T_1$ (temperature sensor 76), $T_{2a}$ (temperature sensor 78a), $T_{2b}$ (temperature sensor 78b), and $T_{2c}$ (temperature sensor 78c) can be used to further detail the actual temperature distribution along the anode pin 64 and the heat flux flowing along and exiting the anode pin 64. Similar components in FIGS. 12A, 12B and 12C have the same reference numerals as those appearing in FIGS. 6A through 7D. It is also to be appreciated that the sensing device of the embodiment of FIGS. 12A through 12C includes a current sensor similar to that disclosed with particular reference to FIGS. 6A through 7D.

Referring again to FIG. 1, the several components of the system of the invention includes the bottom electrode assembly 16 wherein each of the anode pins of the distributed select group have a sensing device which includes temperature sensors 76 and 78 (FIG. 6A) and current sensor 100 (FIG. 7A). The electrical signals generated by these components 76, 78 and 100 are sent to a controller indicated in FIG. 1 at reference number 112. In turn, controller 112 is responsive to the electrical signals derived from temperature sensors 76 and 78 and current sensor 100 and controls the electrical operating parameters of DC power system 12. A display 114 similar to that of FIGS. 8 and 9 is responsive to the controller 112 and monitors the electrical performance of the anode pins of the bottom electrode assembly 16 for heating by the electric arc in the steel making process of the electric arc furnace 10.

Although the present invention has been disclosed herein as relating to a DC electric arc furnace having a pin type anode bottom assembly with several electrode pins, it is to be appreciated that that the bottom electrode structure may have one or several discrete pin type anode bottom assemblies. Additionally, the current signals used for monitoring and controlling may be of fundamental DC steady state or AC 60 hertz, and may include harmonic signals of other frequencies, e.g. D.C. ripple frequencies or AC harmonic frequencies, all of which signals will provide feedback information for the heating process of the electric arc furnace. It is to be further appreciated that the monitoring of the heating process of an EAF and the dynamic control of the process power supply, e.g. DC power system 12 in FIG. 1, may also be obtained through the sensor system of the invention by controlling the process power set points to change the deflection angle of the electric arc in order to balance the power input to the electric arc furnace.

Even though a preferred embodiment of the invention as disclosed herein above includes the two temperature sensors 76 and 78 of FIGS. 6A through 6C combined with the current sensor 100 of FIG. 7A, the invention also envisions a system including more than two temperature sensors provided along several locations of the anode pin as taught with reference to FIGS. 12A through 12C. Referring to FIGS. 12A and 12B, the arrangement of temperature sensor 78a at $T_{2a}$ is shown duplicated in two additional locations along the pin 64 between $T_1$ and $T_{2a}$ at $T_{2b}$ and $T_{2c}$ for temperature sensors 78b and 78c, respectively.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

What is claimed is:

1. A method for monitoring and controlling the performance of a bottom electrode structure and a deflection angle of an electric arc in an electric steel making furnace, the steps comprising:

providing an organized matrix of electrically discrete elongated anode pins and refractory material means interspersed among the anode pins for maintaining the anode pins electrically discrete, the anode pins having exposed ends disposed within the refractory material means and extending in the direction of elongated length toward an electrically conductive plate secured to distal end portions of the elongated anode pins;

sensing the temperature with a sensing device of at least two spaced apart locations along each one of the distributed select group of the elongated anode pins for providing corresponding electrical signals;

providing in the bottom electrode structure an air cooling duct formed between a base refractory plate assembly and the electrically conductive plate, and wherein each one of the elongated anode pins of the distributed select group of the elongated anode pins is fitted with a sensing device with a first temperature sensor located within each elongated anode pin near its one exposed end extending into the refractory material means of the electric arc furnace and a second temperature sensor located near the bottom of each elongated anode pin within the air cooling duct of the electric arc furnace;

sensing the electrical current flowing through each elongated anode pins of the distributed groups of select elongated anode pins for providing a corresponding electrical signal;

providing a controller responsive to the electrical signals derived at each of the electrode anode pins of the distributed select group of the elongated anode pins of this organized matrix of elongated anode pins;

providing a power supply responsive to the controller for providing process power through the bottom electrode structure and to the electric arc according to measured electrical operating parameters of electrical arc furnace;

displaying an electrical performance monitored by the controller of the organized matrix of elongated anode pins for heating by the electric arc in the electric steel making furnace;

wherein said sensing the temperature with the sensing device including a protective sheath containing an insulating material for providing electrical isolation so as to mitigate potential over voltage damage to the sensing device; and wherein the sensing device is located within the protective sheath and is held in contact with the anode pin by a biasing device, and wherein the sensing device also includes a spring acting axially along the protective sheath, and wherein the biasing includes a ball and spring plunger assembly.

2. The method of claim 1 the steps further including mapping and trending the measured and calculated temperatures and current distributions in the bottom electrode structure for the proposes of detailing the heat flow through the elongated anode pins and locating the deflection angle of the electric arc.

3. The method of claim 1 the steps further including correlating the temperature and current distribution of the elongated anode pins, and trending to assess the condition of the bottom electrode structure.

4. The method of claim 1 the steps further including controlling the process power set points to change the deflection angle of the electric arc in order to balance the power input to the electric steel making furnace.

5. The method of claim 1 wherein said providing an organized matrix is of an organized matrix between about 100 and about 300 elongated anode pins.

6. The method of claim 1 wherein sensing the temperature is within one of a distributed group of between about 40 and about 60 select elongated anode pins.

7. The method of claim 6 wherein said sensing the temperature is within longitudinal bores in the group of select elongated anode pins.

8. The method of claim 7 wherein said sensing the temperature is within longitudinal bores in the group of select elongated anode pins, the bores extending from the distal ends of the select elongated anode pins toward the exposed ends of the select elongated anode pins.

9. The method of claim 6 wherein said sensing the electrical current is within longitudinal bore in the group of select elongated anode pins.

* * * * *